April 29, 1958  T. W. PLANTE  2,832,584
SINTER TREATING APPARATUS AND METHOD
Filed March 8, 1955  5 Sheets-Sheet 1

INVENTOR.
THOMAS W. PLANTE.
BY
Christy, Parmelee and Strickland
ATTORNEYS.

INVENTOR.
THOMAS W. PLANTE.

April 29, 1958 — T. W. PLANTE — 2,832,584
SINTER TREATING APPARATUS AND METHOD
Filed March 8, 1955 — 5 Sheets-Sheet 3

INVENTOR.
THOMAS W. PLANTE.
BY
ATTORNEYS.

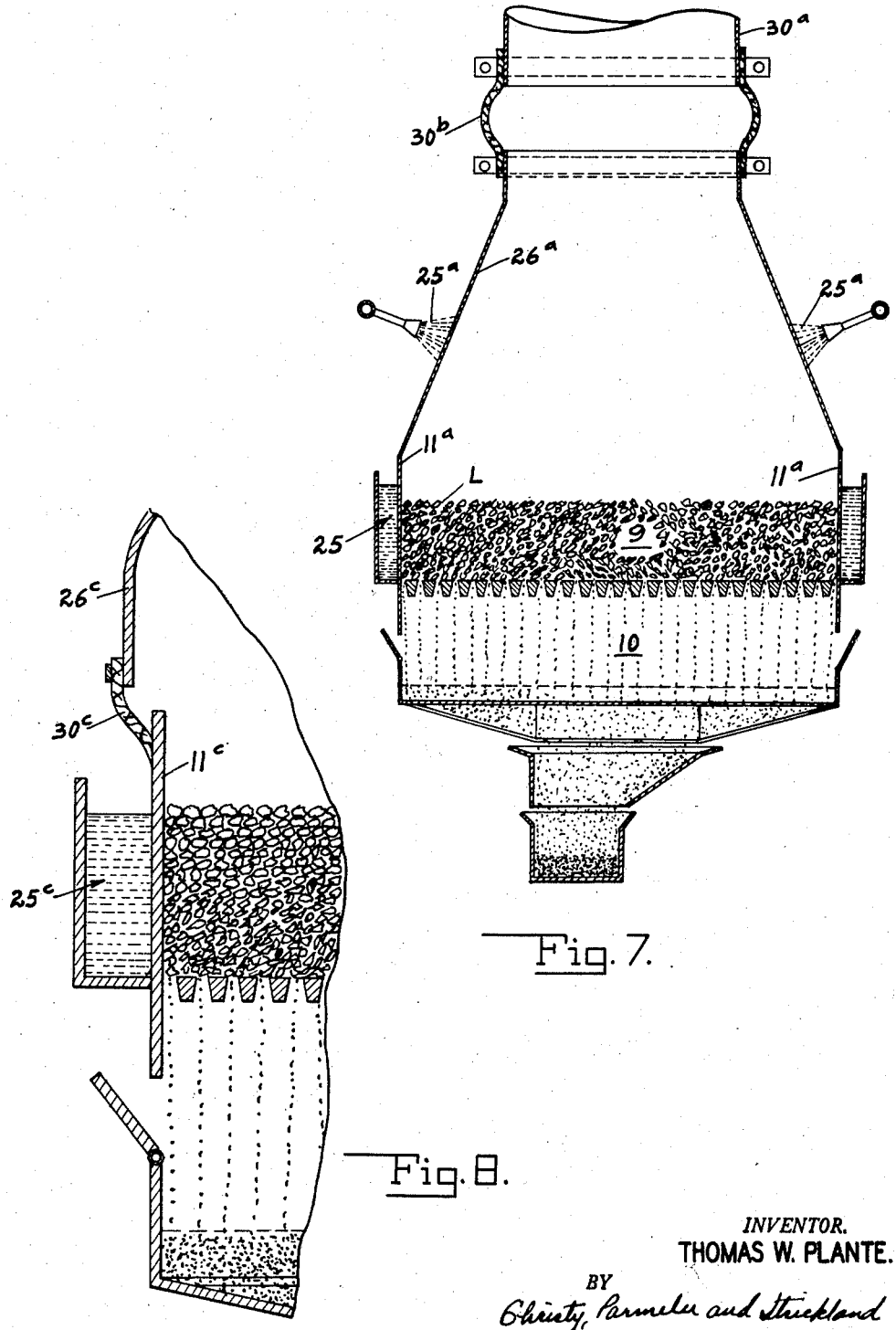

# United States Patent Office 2,832,584
Patented Apr. 29, 1958

2,832,584

SINTER TREATING APPARATUS AND METHOD

Thomas W. Piante, Mount Lebanon Township,
Allegheny County, Pa.

Application March 8, 1955, Serial No. 492,978

10 Claims. (Cl. 266—21)

My invention relates to the treatment of sintered or hot agglomerated ore, and consists in certain new and useful improvements both in apparatus and in method.

The invention will be described and claimed as it is applied to sintered iron ore, with the understanding that the treatment of pelletized ore and other metallurgical materials lies within the field of the invention.

Sintering or pelletizing is effective to agglomerate particulate material composed of finely divided ore into relatively large particles or nodules, pellets, or lumps which may be more efficiently used in the charges of blast furnaces, open hearths, and Bessemer or Thomas converters.

An understanding of the invention does not require that the sintering process per se be described; let it simply be said that the product discharged from a sintering machine is extremely hot and contains a certain percentage of particulate material which must be removed from the sinter and reprocessed. The heat of the discharged sinter presents a serious problem in the transportation of the sinter from the sintering machines to the furnaces in which the sinter is to be used, or to the usual storage site convenient to such furnaces. That is to say, it has been found that railroad cars, conveyor belts, or other vehicles are damaged by the heat of the sinter. Furthermore, as noted, the smaller particulate material must be screened or sifted from the sinter for reprocessing, and during such operation fumes, smoke and dust are evolved, normally polluting the atmosphere of the locality in which the sintering plant is situated.

A common prior practice has been to cool the sinter by spraying or quenching it with water, but this has the disadvantage of deteriorating the product. Another prior method has been to cool the sinter moving on an endless conveyor, by passing air currents through the permeable mass of sinter on the conveyor. Due to the presence of the relatively fine particles in the mass of the sinter, however, the permeability of the mass to the flow of air is relatively low, with the effect that air under practical pressure, or draft, is unable to pass freely through the sinter at a rate which effects a cooling of the sinter at required rate.

The object of my invention is to increase the permeability of a mass of sinter to be cooled, and to cause ample quantites of cooling air, or other gas, to flow easily through the sinter and to cool it quickly and adequately.

A further object of the invention is effectively to remove the objectionable particulate materials from the sinter during the cooling procedure, and in substantial degree to arrest and collect the fumes, smoke and dust which would otherwise tend to pollute the outer atmosphere.

Sometimes a fraction of the finished sinter, that is, a fraction formed of the larger or coarser particles screened from the finished sinter, is returned to the sintering machine to provide what is known in the art as the hearth layer or bed, upon which the relatively fine ore and coke breeze mixture to be sintered is spread and supported, and it is to be understood that a still further object of my invention is to recover this "fraction" of bedding material from the sinter while it is being cooled independently from the relatively fine material which is to be reprocessed with the fresh material to be sintered.

In accordance with the objects of the invention, I produce continuously from the hot sinter delivered from a sintering machine, a well-sized product, a product free from objectionable fines, and a product which is sufficiently cooled by air to avoid damage to the equipment that subsequently handles it, without resorting in any degree to objectionable liquid quenching. Other objects will appear in ensuing description of the invention.

Exemplary apparatus, in which and in the operation of which my invention is realized, is illustrated in the accompanying drawings, wherein:

Fig. 7 is a view comparable with Fig. 3, illustrating certain modifications in structural detail; and Fig. 8 is a fragmentary sectional view, showing other modifications in structural detail.

Figure 1:
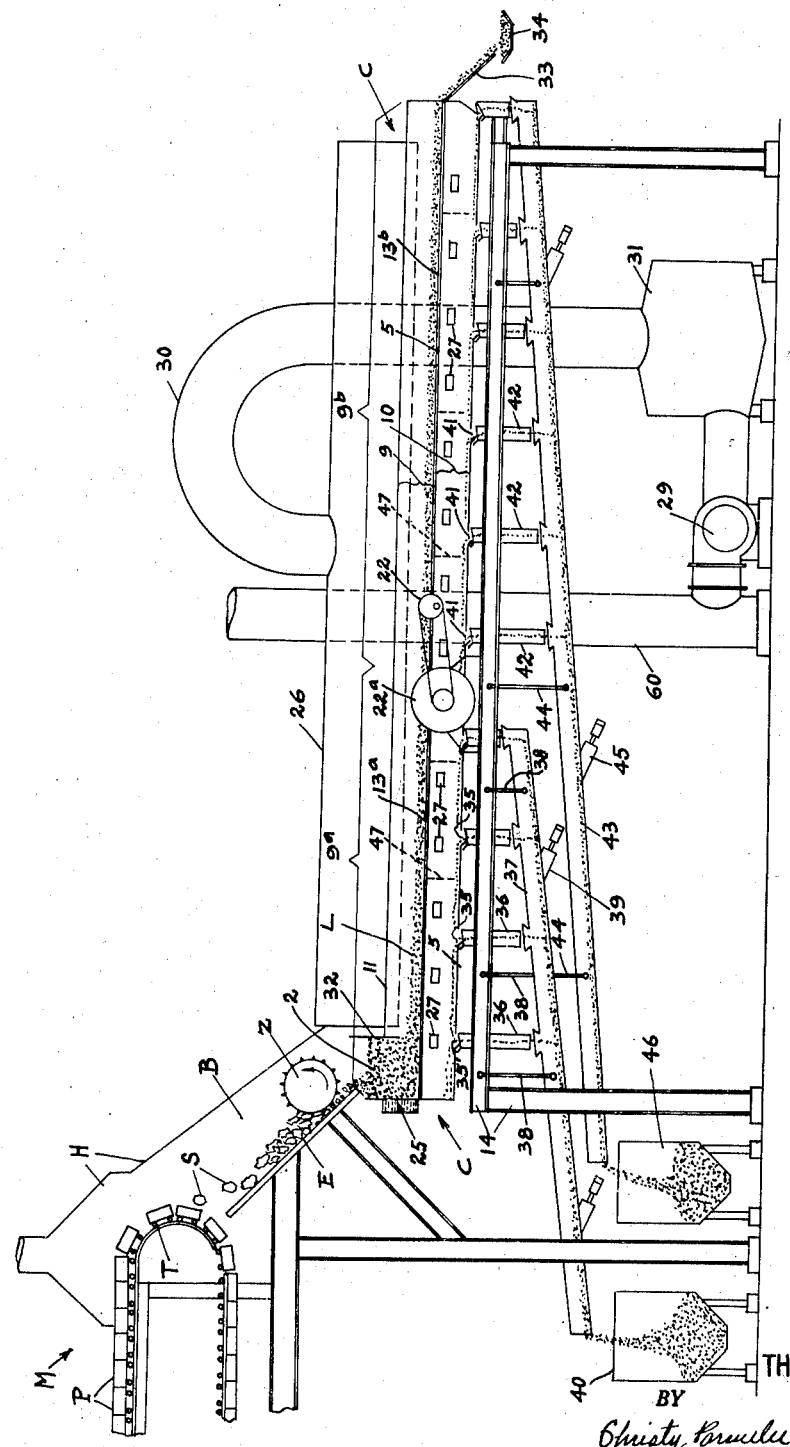
Fig. 1 is a diagrammatic view showing my apparatus partly in side elevation and partly in vertical section, at the discharge end of a sintering machine, which appears fragmentarily and in vertical section.
Figure 2:
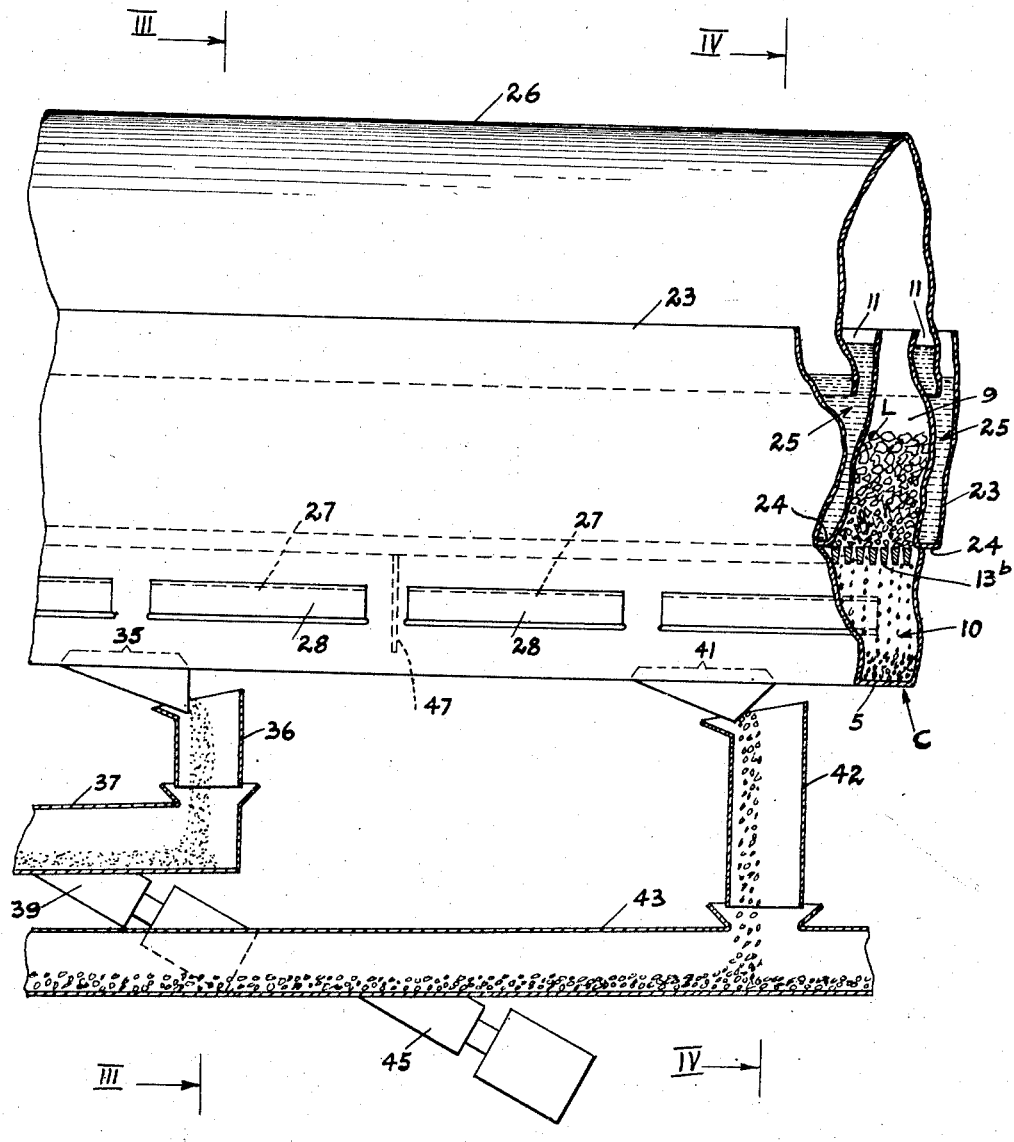
Fig. 2 is a fragmentary view showing my apparatus on larger scale, and partly in side elevation and partly in vertical section on the longitudinal mid-plane of the apparatus.

Referring to Fig. 1 of the drawings, the discharge end of a continuous type ore sintering or agglomerating machine M, well-known in the art, carries the mixture to be sintered on the upper reach of an endless conveyor comprised of pans or pallets P. As the pallets P in sequence reach the discharge end of the machine and around the curved track T the sintered product S in each pan is dumped into a chute B, the inclined bottom of which is formed by a heavy steel plate E. The discharged masses of sinter (S) descend by gravity on plate E, and pass under the usual crusher Z into a hopper 2 at the intake end of the apparatus in which my invention is found. It may be noted that the sintering machine and its delivery chute are enclosed within a hood H for the arrest and abatement of the fumes, smoke and dust.

In passing it may be remarked that in accordance with prior practice a grizzly screen is provided at the bottom of the chute B; but as those skilled in the art will perceive I eliminate the need for such a screen, wherefore the required height of the sintering machine may be substantially reduced, with manifest economies in construction and operating costs. Also, it will be noted that in my apparatus, which is combined with the machine M, I eliminate the need for a separate feeding mechanism for spreading the sinter in a uniform layer of the substantial depth indicated at L in the drawings. As will presently appear a sinter-spreading device is inexpensively incorporated immediately within my apparatus.

Figure 5:
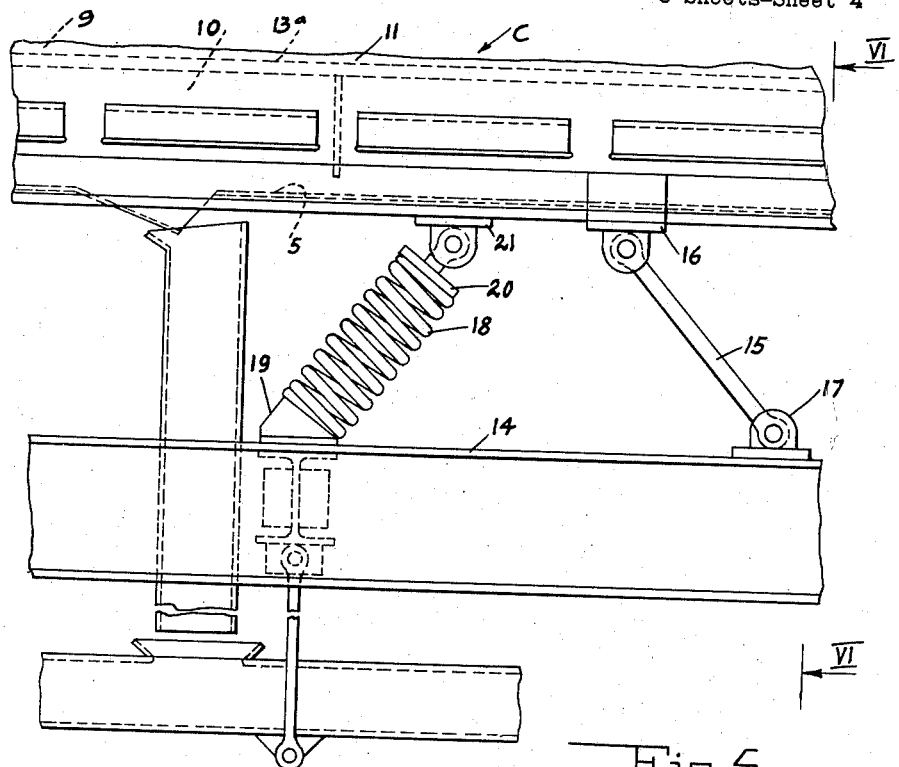
Fig. 5 is a fragmentary view, showing in side elevation the suspension means for the vibratory support or conveyor of the apparatus.
Figure 6:
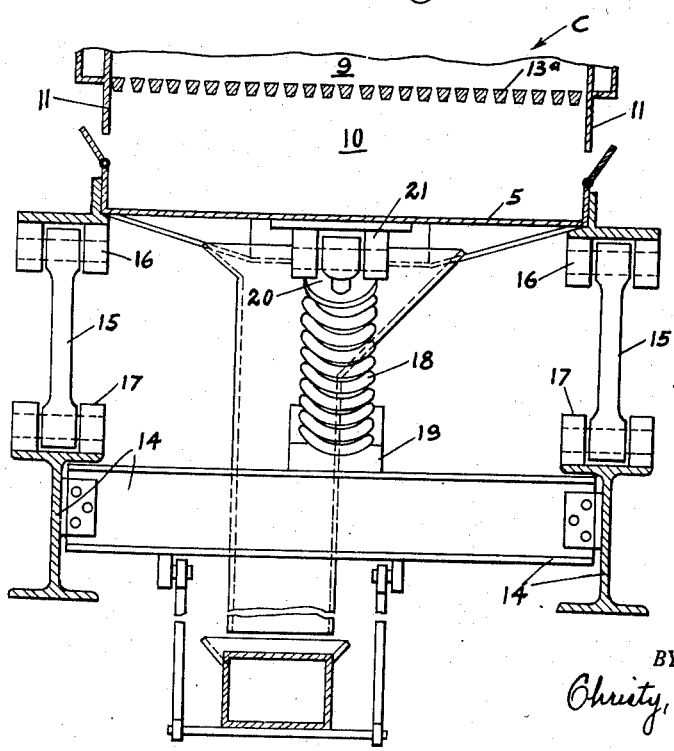
Fig. 6 is a view of the suspension means, as seen on the plane VI—VI of Fig. 5.

The apparatus of my invention comprises a two-stage conveyor C, the upper stage 9 being directly above the lower stage 10. The conveyor is trough-shaped in section (Figs. 3 and 4), having side walls 11 and a floor 5 formed of steel plate. The floor 5 forms the floor of the lower stage 10 of the conveyor, while the floor of the upper stage 9 is formed of grizzly screen bars (13a and 13b) mounted at an interval above the floor 5. As shown on Figs. 5 and 6 the two-stage conveyor is suspended or supported upon a rigid structural steel frame 14, by means of paired angularly extending arms 15 pivoted at their upper ends to brackets 16 fixed to the conveyor body, and at their lower ends to brackets 17 fixed to the frame 14. The tendency for the inclined arms 15 to swing counterclockwise under the weight of the conveyor is opposed by an inclined compression spring 18 biased centrally of the paired arms 15 between a stationary bearing block 19 on the frame 14 and a follower block 20 pivotally connected to a bracket 21 secured to the conveyor body. The inclination of the spring 18 is in opposition to the inclination of the arms 15, whereby the weight of the conveyor is yieldingly sustained by the said arms and spring. Indeed, a plurality of sets of such arms and spring are provided at spaced intervals longitudinally of the conveyor C, whereby the conveyor is yieldingly supported throughout its length.

Means are provided for rapidly reciprocating the conveyor, such as the conventional eccentric 22 and its motor drive 22a, diagrammatically indicated in Fig. 1. Since conveyor reciprocating mechanisms of this sort are thoroughly known in the art, it is pointless to involve this specification further with the mechanical details of the reciprocating mechanism. Suffice it to say that the mechanism reciprocates the conveyor, and that by virtue of the mechanical characteristics of the supports 15—18 the motion of the conveyor includes both vertical and horizontal components, the significance of which will presently appear.

The upper stage 9 of the conveyor comprises a perforate support for the sinter to be screened and cooled. The upper stage includes a series of perforate support portions, in this case two portions 9a and 9b arranged in alignment end to end. The floor of portion 9a is formed of longitudinally extending grizzly screen bars 13a (Fig. 3) of suitable heat-resisting metal. Preferably the bars 13a in cross section are of the inverted frusto-triangular shape shown in Fig. 3. The manner of supporting and reinforcing the bars in the conveyor structure will be readily understood in the art. The perforate floor of the second support portion 9b is similarly formed of bars 13b (Fig. 4), it being noted that the openings between the bars of the first support portion 9a are smaller than the openings between the bars of the second support portion 9b. It will be understood, therefore, that the upper stage 9 of the conveyor comprises in effect two differently sized grizzly screens arranged end to end in an integrated structure.

Figures 3, 4:
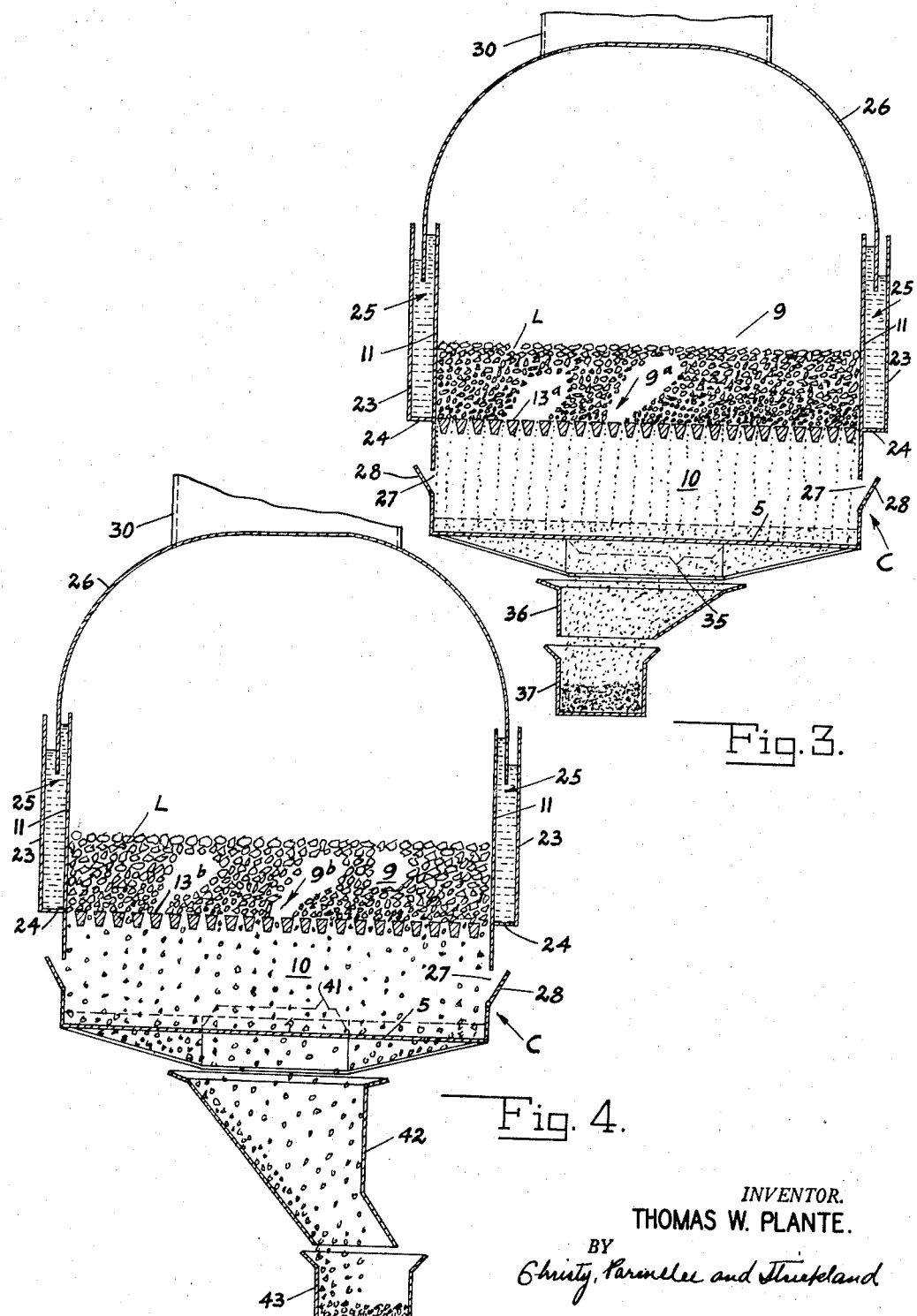
Fig. 3 is a view of the apparatus in cross section, the plane of section being indicated at III—III in Fig. 2.
Fig. 4 is a view in cross section, taken on the plane IV—IV of Fig. 2.

The side walls of the upper stage of the conveyor C carry spaced therefrom outer plates 23 and 24 that form a channel for a body of cooling water 25, in which the lower edges of a stationary hood 26 are immersed, as will be seen in Figs. 3 and 4. By virtue of this structure not only are the side walls of the upper stage of the conveyor water-cooled but the edges of the hood are hermetically sealed to the conveyor, while permitting the conveyor to be vibrated, as described. The substantial "walls" of cooling water are in thermal communication with the layer L of sinter, that is, the water is in intimate contact with the side walls of the upper stage of the conveyor, through which the hot sinter passes, and serves to assist in cooling the sinter without direct contact therewith, as well as to protect the conveyor walls from thermal injury. Since the water does not come into direct physical contact with the sinter, it may be said that the sinter is in indirect thermal communication with the water. As shown in Fig. 1 the water "wall" 25 is continued around the hopper 2 at the intake end of the sinter-treating machine, where thermal protection is most needed.

The side wall plates 11 of the lower stage 10 of the conveyor include air inlets 27, provided with adjustable louvre plates 28, and an exhauster fan 29 is provided to draw cool air through said inlets, upward through the grizzly screen bars 13a and 13b, and thence into a duct 30 and a wet or dry multiclone or cyclone gas cleaner 31 into a stack 60 that discharges into the open atmosphere.

Turning now to the operation of the apparatus, the vibrating conveyor C, due to the vertical and horizontal components of its vibrating motion, draws sinter S from the hopper 2 and advances the sinter in left-to-right direction on the grizzly screen (13a) of the support portion 9a (Fig. 1). The sinter passes beneath the lower edge of a vertically adjustable gate 32 that forms the forward wall of the hopper 2. The lower edge of the gate 32 serves to distribute the hot sinter, and to regulate the depth of the sinter layer L on the screen that forms the floor of the upper stage of the conveyor. The layer or bed of sinter advances along the screen (13a) of the first support portion 9a of the conveyor and then along the screen (13b) of the second support portion 9b, whence the sinter is discharged upon a chute 33 to a belt conveyor 34, or other suitable vehicle, for delivery to any desired point. In the course of such vibrating advance of the layer L of sinter the unsintered and relatively fine particles are worked downwardly through the sinter layer L and drop through the screen bars 13a into the portion of the lower conveyor stage 10 that lies below the portion 9a of the conveyor. While this screening or sifting action occurs, air is drawn through the inlets 27, under the effect of the exhauster fan 29, and passes upwardly in substantially vertical direction between the bars of the grizzly screen and through and transversely of the plane of the permeable layer of sinter supported thereby. The passage of the cool air from the outer atmosphere through the layer L acts to cool the hot sinter. As the sinter passes to and advances over the second support portion 9b, the coarser particles in the sinter layer are sifted downwardly between the more widely spaced bars 13b into the portion of the lower stage 10 below portion 9b, while the streams of cooling air pass upwardly through the sinter. The end of the lower stage 10 of the conveyor is open beneath the discharge chute 33, and air enters through such open end to supplement the air drawn in through the inlets 27 for cooling the sinter. The vertical component of the vibrating motion of the conveyor is effective repeatedly to increase the spaces between the lumps and particles of sinter that form the layer L, and this action of the lumps and particles of sinter increases the permeability of the layer to the flow of the cooling streams of air, whereby when the sinter, cleansed of the relatively fine and coarser particles, reaches the discharge chute 33 it is adequately cooled.

The agitation and vibration which increase the permeability of the sinter layer exposes the surfaces of the lumps and particles of sinter to more intimate contact with the cooling air, and greatly increases the cooling efficiency of the process.

The relatively fine material screened from the sinter in the course of its flow through the first screen portion 9a falls to the floor 5 of the lower stage 10 of the conveyor, and, due to the vibrating motion of the conveyor, the material is propelled in left-to-right direction (Fig. 1) and drops through trap holes 35 in the floor 5, whence the material is funneled through downtakes 36 into a conveyor in the form of an inclined trough 37. The trough is suspended from the frame 14 on pivoted links 38, and a vibrating device 39 is arranged to reciprocate the trough rapidly, whereby the fine material is caused to advance right to left and is delivered into a bin 40, wherefrom it may be removed to add to the new mixture of ore and coke breeze to be charged into the sintering machine.

The coarser particles of material which are screened from the sinter advancing through the second portion 9b fall to the floor 5 of the lower stage 10, and, traveling in left-to-right direction along the said floor, drop through the trap holes 41 and downtakes 42 into an inclined trough 43. The trough 43 is pivotally suspended from the frame 14 on links 44, and a vibrator 45 oscillates the trough, causing the coarse particles to be delivered into a bin 46. The coarse material, thus separated from the finer material, may be used as the bedding layer for the raw mixture to be sintered in the pallets or pans P of the sintering machine.

The water-sealed engagement of the hood 26 with the vibrating conveyor C is effective to confine within the apparatus the fumes, smoke and dust created during the screening and cooling of the sinter, and such fumes, smoke and dust are drawn, together with the air flowing upwardly through the sinter layer L, through duct 30 into gas cleaner 31, wherein the fumes are condensed and separated with the smoke and dust from the air and gases delivered by the exhauster 29 into stack 60. The solid material accumulating in the gas cleaner 31 is removed from time to time, and suitable disposition made of it.

In Fig. 7 certain modifications are illustrated. The two-stage conveyor and the hood may be integrally constructed, that is, the side walls 11a of the conveyor are extended upwardly to form the hood 26a which entirely encloses the space above the conveyor structure, save at an outer opening at the top of the hood, which opening is, as shown, connected to the exhauster duct 30a, by means of a flexible sleeve 30b of a suitably impregnated fabric. The flexible sleeve permits the essential vibration of the conveyor and hood relatively to the stationary exhauster duct 30a. The cooling "walls" 25 of water are provided in the modified structure, and water sprays 25a are played upon the sides of the hood 26a, cooling the walls of the hood, and supplying the water to the water "walls" 25a that make up for water lost by evaporation under the effect of the heat yielded by the hot sinter being cooled. In some cases, a continuous circulation of cooling water may be maintained to afford additional thermal protection.

The lower compartment or stage 10 of the conveyor is provided with transverse partitions 47 at spaced apart points along the conveyor, and these partitions serve to distribute the air drawn through layer of sinter longitudinally of the conveyor.

Fig. 8 shows another modification in structural detail. The yielding joint between the stationary hood 26c and the side walls 11c of the vibrating conveyor may comprise resilient flaps 30c secured to the lower edges of the hood. The flaps on the two sides of the hood bear with sliding contact at their lower edges against the sides 11c of the conveyor immediately above the "walls" of cooling water 25c, as will be understood upon considering the fragmentary drawing of Fig. 8.

It may be noted that the cooling water "walls" need not be extended throughout the length of the cooling conveyor C, but may be eliminated in the portion of the conveyor near the discharge end, where the sinter will have been cooled to the point where heat presents no problem.

Instead of drawing the cooling air upwardly through the layer or bed L of sinter undergoing treatment, the air may be supplied under pressure in the lower stage of the conveyor and forced upwardly through the sinter. Alternatively, the air may be drawn downwardly through the sinter, by applying the exhausting effect to the chamber in the lower stage of the conveyor.

It is manifest that the arranging of the positions of the trap holes 35 and 41 longitudinally of the conveyor, in conjunction with the disposition of the spaces between the screen bars 13a and 13b, affords control of the sizes and amounts of the particles screened from the sinter. At the charging end of the apparatus the spaces between the screen bars are preferably small, to accomplish removal in the desirable hot condition of the very fine material only. Toward the discharge end of the conveyor, where coarser sizes are desired at lower temperature, the screen openings are larger, conforming to the particle size desired.

There is an advantage in using screen bars of inverted tapered form. When wear occurs in the bars, and the openings between the bars become enlarged, the bars may be moved from the first portion 9a of the conveyor to the second portion 9b, where the enlarged openings between the bars will be satisfactory. Regardless of the various sizes of the openings between the bars, there will always be sufficient flow of cooling air admitted to the sinter at a velocity which will not nullify a thorough screening effect.

The arrangement of the apparatus of my invention provides for an advantageous "straight-line" processing of the sinter. An additional advantage is that my apparatus may be constructed of more than one unit, embodying vibrating conveyors of the same or different lengths and permitting departure from the "straight-line" processing of the sinter, and offering flexibility for adapting the apparatus to various sinter plant structures.

Other modifications may be embodied in the structure described without departing from the invention defined in the appended apparatus claims. And it will be understood that the operation of the apparatus described affords one example of how the method of my invention may be practiced.

I claim:

1. The method herein described which comprises supporting in thermal communication with a body of cooling water a distributed permeable layer of the hot product of an ore-agglomerating machine, and under suction drawing cooling air in distributed paths from the outer atmosphere and passing the air through and transversely of the plane of said layer while artificially increasing the permeability of the layer to the passage of said cooling air.

2. The method herein described which comprises supporting in thermal communication with a plurality of bodies of cooling water a distributed permeable layer of the hot product of an ore-agglomerating machine, and passing cooling air in distributed paths through and transversely of the plane of said layer while vibrating the layer with a motion having a vertical component for increasing the permeability of the layer to the passage of air therethrough.

3. For combination with an ore-agglomerating machine, a cooling apparatus having a conveyor mounted for vibration, said conveyor comprising an elongate perforate support provided with channeled side walls for retaining substantial bodies of cooling water, means adjacent to one end of said support for applying thereupon and in thermal communication with said bodies of cooling water a distributed permeable layer of the hot product of said machine, means for effecting the flow of a cooling gas through and transversely of the plane of said perforate support and the permeable layer of the hot product thereon, and means for augmenting the permeability of said layer while said cooling gas is flowing therethrough comprising a mechanism that vibrates the conveyor with a motion having a vertical component.

4. For combination with an ore-agglomerating machine, a cooling apparatus comprising a conveyor mounted for vibration, said conveyor comprising an elongate perforate support provided with channeled side walls for retaining substantial bodies of cooling water, said support extending between product-receiving and product-discharging portions, means adjacent to the product-receiving portion of said support for applying thereupon and in thermal communication with said bodies of cooling water a distributed permeable layer of the hot product delivered by said machine, means for effecting the flow of a cooling gas through and transversely of the plane of said perforate support and said permeable layer thereon, and means for augmenting the permeability of said layer to the flow of said cooling gas comprising a mechanism that vibrates the conveyor with a motion having vertical and horizontal components, whereby the efficiency of the gas in cooling said layer is increased, while the said layer advances along the conveyor from the receiving portion to the discharging portion.

5. For combination with an ore-agglomerating machine, a cooling apparatus comprising a conveyor mounted for vibration, said conveyor comprising an elongate perforate support provided with channeled side walls for retaining substantial bodies of cooling water, said support extending between product-receiving and product-discharging portions, means adjacent to the product-receiving portion of said support for applying thereupon and in thermal communication with said bodies of cooling water a distributed permeable layer of the hot product delivered by said machine, a stationary hood arranged to extend over the layer of the hot product on said conveyor support and having depending edges sealed in said bodies of cooling water, means comprising a blower cooperating with said hood for effecting a distributed flow of cooling air in substantially vertical direction through said perforate support and the relatively thick permeable layer of hot product distributed thereupon, and means for augmenting the permeability of said layer while said cooling gas is flowing therethrough comprising a mechanism that vibrates the conveyor with a motion having a vertical component.

6. For combination with an ore-agglomerating machine, a cooling apparatus comprising a conveyor mounted for vibration, said conveyor comprising an elongate perforate support extending between product-receiving and product-discharging portions, means adjacent to the receiving portion of said support for applying thereupon a distributed permeable layer of the hot product delivered by said machine, side walls extending upwardly along the two sides of said support and in thermal communication with said layer, said side walls having longitudinally extending channels for retaining cooling water during conveyor vibration, a stationary hood mounted over said conveyor and having depending side walls immersed at their lower edges in the cooling water in said channels for forming a gas seal between the vibrating conveyor and the stationary hood, a duct leading from said hood, a fan arranged to propel air through said passage and hood for effecting a cooling flow of air through and transversely of the plane of said perforate support and the permeable layer of hot product thereon, and means for augmenting the permeability of said layer while the cooling air is flowing therethrough comprising a mechanism that vibrates the conveyor with a motion having a vertical component.

7. For combination with an ore-agglomerating machine, a cooling apparatus comprising a conveyor mounted for vibration, said conveyor comprising an elongate perforate support extending between product-receiving and product-discharging portions, means adjacent to the receiving portion of said support for applying thereupon a distributed permeable layer of the hot product delivered by said machine, side walls extending upwardly along the two sides of said support and in thermal communication with said layer, said side walls having longitudinally extending channels for retaining cooling water during conveyor vibration, a stationary hood mounted over said conveyor and having depending side walls immersed at their lower edges in the water in said channels for forming a gas seal between the vibrating conveyor and the stationary hood, a duct leading from said hood, a fan arranged to propel air through said passage and hood for effecting a cooling flow of air through and transversely of the plane of said perforate support and the permeable layer of hot product thereon, means for cleansing the air drawn through said permeable layer comprising a dust collector arranged in the line of air flow through said duct, and means for augmenting the permeability of said layer while the cooling air is flowing therethrough comprising a mechanism that vibrates the conveyor with a motion having a vertical component.

8. For combination with an ore-sintering machine, a sinter-cooling apparatus comprising a conveyor mounted for vibration, said conveyor comprising a two-stage structure, the upper stage comprising a perforate support for a permeable layer of hot sinter including particulate material, said upper stage having sinter-receiving and discharging portions, means adjacent the sinter-receiving portion of said support for applying thereupon said permeable layer, the lower stage comprising a space having side walls and a floor spaced below said perforate support and having a trap hole opening downwardly through such floor, a hood mounted over the upper stage of said conveyor, a fan connected for exhausting gases from within the hood and drawing cooling air from the outer atmosphere upwardly through the perforate support and the permeable layer thereon, means in said lower stage for distributing over the extent of the bottom of said supported layer the streams of cooling air drawn from the outer atmosphere, and means for augmenting the permeability of said layer while said cooling gas is flowing therethrough comprising a mechanism that vibrates the conveyor with a motion having a vertical component.

9. For combination within an ore-sintering machine, a sinter-cooling apparatus comprising a conveyor mounted for vibration, said conveyor comprising a two-stage structure, the upper stage comprising a perforate support for a permeable layer of hot sinter including particulate material, said upper stage having sinter-receiving and discharging portions, means adjacent the sinter-receiving portion of said support for applying thereupon said permeable layer, the lower stage comprising a space having side walls and a floor spaced below said perforate support and having a trap hole opening downwardly through such floor, a hood mounted over the upper stage of said conveyor, a fan connected for exhausting gases from within said hood, the walls of said lower stage including a plurality of spaced inlets for admitting air from the outer atmosphere, whereby under the exhausting effect of said fan cooling air from said inlets is distributed and drawn upwardly through said perforate support and said permeable layer thereon, means for augmenting the permeability of said layer to the flow of said cooling gas while also causing the layer to advance from said receiving portion to said discharging portion comprising a mechanism that vibrates said conveyor with a motion having vertical and horizontal components, whereby the advancing layer of hot product is cooled and particulate material is screened therefrom into said lower stage and the vibration of said conveyor caused to effect the movement of the screened material over the floor of said lower stage to said trap hole.

10. For combination with an ore-sintering machine, a sinter-cooling apparatus comprising a conveyor mounted for vibration and having a sinter-receiving portion and a sinter-discharging portion, said conveyor comprising a two-stage structure, the upper stage having two perforate support sections extending in succession between said sinter-receiving and sinter-discharging portions, with the perforations in the first support section smaller than those in the second support section, means adjacent to said sinter-receiving portion for applying upon said first support section a distributed permeable layer of hot sinter delivered by said ore-sintering machine, the lower stage of said conveyor comprising two floor portions arranged severally beneath said support sections and each floor portion including a series of trap holes, a conveyor arranged beneath each series of trap holes, means for effecting the flow of cooling air through and transversely of the plane of said perforate support sections and the permeable layer of hot sinter thereon, and means for advancing the layer of sinter from said receiving portion to said discharging portions while augmenting the permeability of said layer of sinter to the flow of cooling air, said last-mentioned means comprising a mechanism that vibrates the conveyor with a motion having a vertical component for not only increasing the permeability of the sinter layer to the flowing air but additionally enhancing the screening of particulate material through said support sections to the floor portions therebelow, over which floor portions of the vibrating conveyor the screened material advances to and falls through said trap holes, and means arranged below each floor portion for selectively rceeiving the falling screened material.

References Cited in the file of this patent

UNITED STATES PATENTS

| | | |
|---|---|---|
| 987,460 | Heldman | Mar. 21, 1911 |
| 1,069,191 | Von Schlippenbach | Aug. 5, 1913 |
| 1,896,625 | Hyde | Feb. 7, 1933 |
| 2,213,396 | Hyde et al. | Sept. 3, 1940 |
| 2,247,271 | Barlow | June 24, 1941 |

FOREIGN PATENTS

| | | |
|---|---|---|
| 661,949 | France | Mar. 12, 1929 |
| 523,393 | Germany | Apr. 23, 1931 |
| 748,413 | France | Apr. 18, 1933 |
| 595,870 | Germany | Apr. 24, 1934 |